(12) United States Patent
Webb

(10) Patent No.: US 6,382,079 B1
(45) Date of Patent: May 7, 2002

(54) VIBRATION SPECIFIC BELLOWS ASSEMBLY

(76) Inventor: Thomas J Webb, 15 Hearn La., Hamden, CT (US) 06514

( * ) Notice: Subject to any disclaimer, the term of this patent is extended or adjusted under 35 U.S.C. 154(b) by 0 days.

(21) Appl. No.: 09/413,977

(22) Filed: Oct. 7, 1999

Related U.S. Application Data

(60) Provisional application No. 60/102,808, filed on Oct. 2, 1998.

(51) Int. Cl.[7] .................................................. F16J 3/00
(52) U.S. Cl. .......................................... 92/41; 73/729.1
(58) Field of Search ............................... 92/40, 41, 47; 73/384, 386, 702, 729.1, 729.2, 730

(56) References Cited

U.S. PATENT DOCUMENTS 4,183,372 A * 1/1980 Ueda et al. .................... 137/81

FOREIGN PATENT DOCUMENTS

JP                 05318110 A   * 12/1993

* cited by examiner

*Primary Examiner*—Edward K. Look
*Assistant Examiner*—Thomas E. Lazo
(74) *Attorney, Agent, or Firm*—Paul R. Webb, II

(57) ABSTRACT

An evacuated and hermetically sealed bellows assembly has a bellows core assembly for mechanical movement versus pressure differential requirements. Mechanical attachment means are secured to the opposite ends of the bellows assembly. Vibrational optimization is provided to the bellows assembly to reduce predetermined frequencies.

4 Claims, 1 Drawing Sheet

VIBRATION SPECIFIC BELLOWS ASSEMBLY

This application claims the benefit of the U.S. provisional application, Ser. No. 60/102,808, filed Oct. 2, 1998.

BACKGROUND OF THE INVENTION

1. Technical Field

This invention relates to a sealed bellows assembly and more particularly to such a sealed bellows assembly useful in an aircraft pneumatic bleed pressure controller for regulating pneumatic pressure relative to aircraft altitude.

2. Background Information

A sealed bellows assembly is useable when differential pressure is translated in to a function of mechanical motion via differential length of the bellows assembly. Such pressure sensitive mechanisms are utilized in aircraft as a means of sensing or controlling systems relative to aircraft altitude. Differential pressure between a reference pressure inside the bellows assembly, usually but not necessarily O PSIA, and the external pressure produces a function corresponding to the change in mechanical length of the bellows assembly. Numerous differential pressure versus mechanical properties functions of the bellows assembly are possible.

Previous designs are dependent upon the use of a dampening fluids, plastic, or other dampening materials to ensure that the bellows assembly does not succumb to vibration inherent in aircraft and engines, and performs as required in the rugged environments found on aircraft and engines. Typically, aircraft applications are extremely demanding in that there can be significant levels of vibration and temperature present along with damaging chemicals, ranging from fuels and oils to chemical cleaners.

Design limitations with other bellows assemblies cause operational problems. The primary problem is the inability to evacuate completely the bellows assembly for precise reference pressure due to the vapor pressure of the dampening fluid or fluids and the carbonaceous guide assemblies. This causes the reference altitude versus ambient pressure function to be inaccurate with time while the struggle for chemical equilibrium within the sealed bellows assembly causes the reference pressure to change until the mechanical or operational limits of the bellows have been reached. The resulting internal pressure changes cause system inaccuracies, and incorrect system operation. At periodic intervals, the bellows assembly reference pressure function shifts past the point to which the controller it is mounted to can be compensated, and the bellows assembly requires replacement.

Variable reference pressure shifts of prior bellows assemblies also causes technical problems. The primary problem is the controller assembly uses a changing reference, which causes system imperfection and deteriorating system accuracy. Secondary problems with the incorrect reference settings occur in unit to unit variance which results in engine or other systems functions being performed without required accuracy and precision. The changes in the bellows and controller precision are not necessarily consistent with time, but vary from unit to unit based on individual bellows' construction, time since built, temperature, environment, and running time on aircraft or engines.

Thus a need exists for a vibrational optimized, evacuated bellows assembly.

SUMMARY OF THE INVENTION

Briefly, the present invention satisfies the need for a sealed bellows assembly that will reproduce the original pressure settings for extended periods of time.

The present invention provides an evacuated and hermetically sealed structure. Mechanical attachment means are secured to the assembly at opposite ends thereof. The bellows assembly is vibrationally optimized to a predetermined frequency. The bellows assembly frequency is tuned so that it is not in the frequency range of its operating environment.

These and other features and advantages of this invention will become apparent from the following detailed description of the various aspects of the invention taken in conjunction with the accompanying drawing.

BEST MODE FOR CARRYING OUT THE INVENTION

Figure 1:
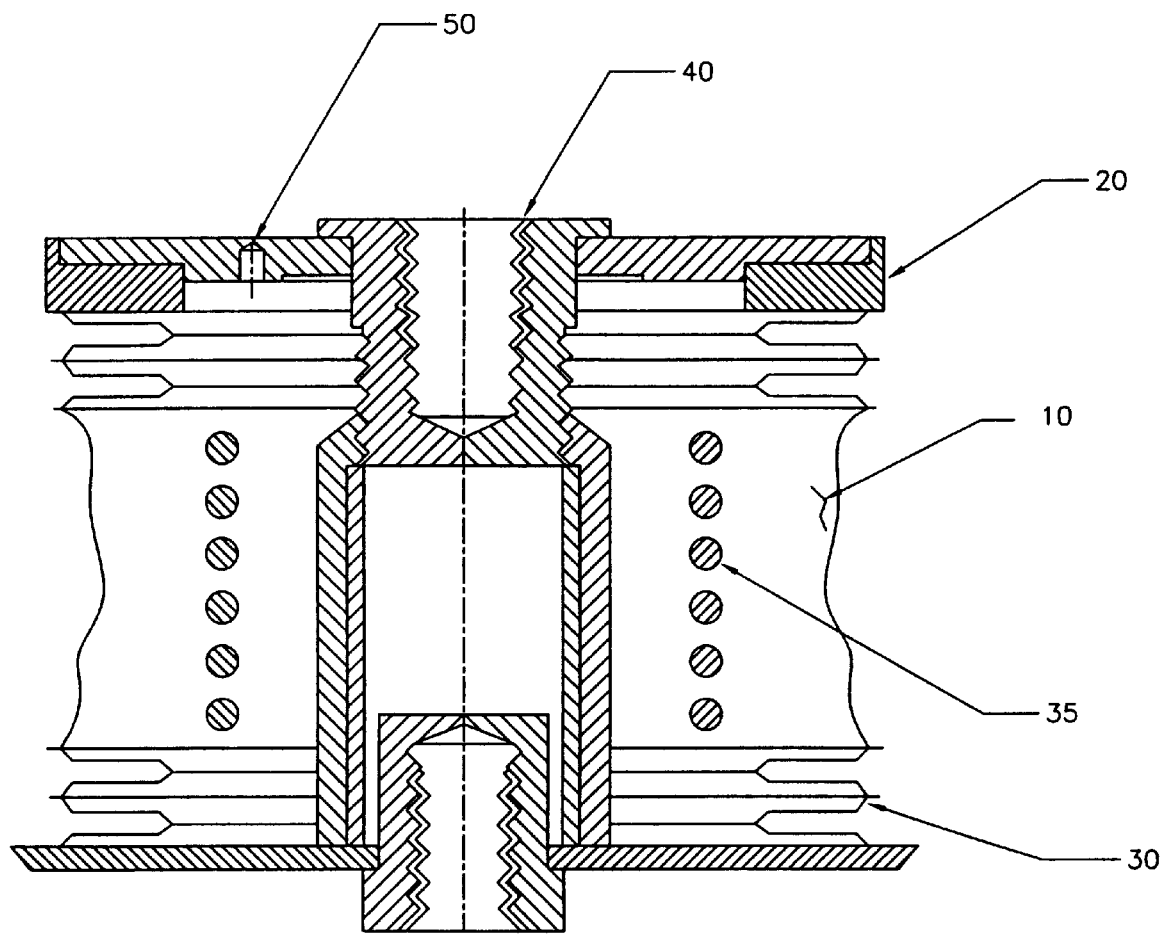
FIG. 1 is a partial cross-sectional view of a vibration-specific bellows assembly in accordance with the present inventions.

FIG. 1 is a partial cross-sectional view of a vibration-specific bellows assembly 10, is accordance with the present invention. Assembly 10 is evacuated and hermetically sealed. Military specification MIL-S-8805 sets forth the enclosure leakage requirements for a hermetically sealed assembly. Copies of military specifications are available for example at the Defense Automated Printing Service, Building 4/D 700 Robbins Avenue, Philadelphia, Pa. 19111. Assembly 10 is comprised of appropriate materials 20 selected from nickel alloys, cobalt alloys, titanium and titanium alloys. These materials address the environmental concerns of the operating environment.

Bellows core assembly 30 is designed to operate mechanical movement versus pressure differential requirements. The differential pressure is translated into a function of mechanical motion via differential length of the bellow core assembly. An aircraft pneumatic pressure controll employing a bellows assembly is utilized in an aircraft as a means of controlling pneumatic pressure relative to aircraft altitude. At least one additional spring 35 is positioned within bellows assembly 10. Mechanical attachments means 40 are provided at opposite ends of bellows assembly 10 to secure it within a device, such as the aircraft pneumatic pressure controller. Stabilization is provided by the structure supporting attachments means 40. The carbonaceous guide assemblies and dampening fluids have been eliminated by the present invention.

To eliminate the inconsistencies of currently available bellows assemblies, a bellows assembly was developed and tested to higher temperature, higher vibration, and harsh environmental requirements. Extensive testing in the lab produced an extremely capable sealed bellows assembly that will reproduce the original reference pressure settings for extended periods of time. Unlike existing bellows designs, which use materials to dampen vibration that also deteriorate with time causing the initial internal pressure setting to change, the present bellows assembly uses vibrational tuning. The bellows assembly is designed to work within preferable frequency ranges and to avoid or minimize resonance frequencies. By excluding the dampening materials that induce reference pressure changes, the use of dampening materials that result in reference pressure changes has been eliminated Vibrational tuning requires the calculation of the overall center of gravity, mass of assembly and spring constant(s). If desired, more than one spring may be employed in the bellows assembly. After the calculations, the bellows assembly is tuned to achieve vibration optimization for an application. Thus the vibrational tuning as opposed to the vibration dampening materials, dampens the vibrations whereby the original reference pressure settings are reproduced for extended periods of time. Bellows assembly 10 is evacuated substantially through part 50. It is preferred to seal hermetically assembly 10 by electron beam welding. The present invention thereby overcomes the previous problem by substantially or completely evacuating the assembly for precise reference pressure.

While specific embodiments of the present invention have been described it will be apparent to those skilled in the art that various modifications thereto can be made without departing from the spirit and scope of the invention as defined in the appended claims.

What I claim is:

1. A vibration-specific bellows assembly comprising a vibrationally tuned bellows assembly with a predetermined frequency outside of the range of the operating environment, said bellows assembly being evacuated and hermetically sealed, and mechanical attachment means secured to said bellows assembly at opposite ends thereof.

2. The vibration-specific bellows assembly of claim 1 wherein the material thereof is selected from the group consisting of nickel alloys, cobalt alloys, titanium and titanium alloys.

3. The vibrational-specific bellows assembly of claim 1, wherein at least one additional spring is positioned within the bellows assembly.

4. A vibration-specific bellows assembly comprising a bellows core assembly for mechanical movement versus pressure differential requirements, covers at opposite ends of said bellows core assembly, mechanical attachments means secured to said covers, said bellows assembly being vibrationally tuned with a predetermined frequency outside of the range of the operating environment, and said bellows being evacuated and hermetically sealed.

* * * * *